April 16, 1968 F. T. SPENCER 3,378,432
LIMP AND DRAPEABLE POLYURETHANE FOAM SHEETING AND
METHOD OF MAKING IT
Filed May 20, 1966

Inventor
Francis T. Spencer
by Roberts Cushman & Grover
Attys

United States Patent Office 3,378,432
Patented Apr. 16, 1968

3,378,432
LIMP AND DRAPEABLE POLYURETHANE FOAM SHEETING AND METHOD OF MAKING IT
Francis T. Spencer, Biddeford, Maine, assignor to West Point-Pepperell, Inc., Boston, Mass., a corporation of Georgia
Continuation-in-part of application Ser. No. 184,822, Apr. 3, 1962. This application May 20, 1966, Ser. No. 551,747
The portion of the term of the patent subsequent to June 27, 1984, has been disclaimed
2 Claims. (Cl. 161—116)

ABSTRACT OF THE DISCLOSURE

Process of so treating single-ply, commercial, fully cured plastic foam sheeting as to reduce its natural stiffness and make it soft and limp, and the product of said process.

This invention pertains to sheet material having, in general, the porosity and heat-insulating properties of a foamed plastisol, in particular commercial foamed polyurethane, but which is so soft and limp that it is acceptable as a reat-insulating ply for lamination with woven textile material (as distinguished from knitted fabric) in the manufacture of heat-insulated wearing apparel, and to a method of preparing such a sheet material—the present application being a continuation-in-part of the application for Letters Patent, Ser. No. 184,822, filed Apr. 3, 1962 for Heat-Insulating Material and Method of Making the Same, now abandoned.

Sheet polyurethane foam, as commercially available in various thicknesses and densities, is homogeneous and of substantially uniform cell structure throughout, being produced by slicing a molded loaf or "log" of foam, so that at both faces of the sheet, broken cells are exposed, and thus the material is pervious both to air and water, and has the "breathing" characteristic so essential to comfort in garment construction. However, the sheet foam material, as commercially available is too stiff to be acceptable as an insulating ply for lamination with woven textile fabric in garment manufacture, although it has been used in association with knitted fabric, which, itself, is very limp.

The present invention has for an object the provision of sheet material having the desired heat-insulating values and the porosity and permeability to air and water desirable in a material designed as a lining ply in wearing apparel, and which is also of such a degree of limpness or drapeability that it may be laminated to woven textile fabric to form a laminate acceptable for garment manufacture. A further object is to provide a method of so treating completely cured polyurethane foam, such as the usual commercial sheeting, as to decrease its usual stiffness and indeed to make it so limp and drapeable in all directions that it may be associated with woven textile fabric, by lamination, with a resultant lamellar material which does not differ unduly in limpness and drapeability from the textile fabric alone, so that such a laminate is acceptable for garment manufacture.

Polyurethane foams such as are at present commercially available in sheet form may be so indented, in accordance with the present invention, as to provide permanent depressions therein, without unduly modifying the cellular structure of the material, so that it is still permeable to air and moisture, and without resulting in undue loss of strength or substantial decrease in weight, but with accompanying very marked increase in its drapeability or limpness as compared with the original sheet foam. In the attainment of the above objects and in accordance with the present invention, pressure is applied to the selected commercial, fully cured polyurethane sheet by the use of an embossing implement or, more accurately designated, an indenting implement of such construction as to form indentations in the sheet according to a predetermined pattern or design, the pressure being maintained for a predetermined period and the indenting implement being heated to a selected temperature—the optimum temperature and the period of time during which the pressure is applied varying slightly with the physical characteristics of the foam, for example, as prepared by different manufacturers, and being determined easily, in any given case, by trial and error. For specific example, excellent results have been attained by subjecting a commercial foam to a temperature within a range of from 500° F. to 575° F. and for a period 1–$\frac{1}{100}$ of a minute. Using a lower temperature, for example a temperature with a range of from 320° F. to approximately 450° F., the period of application of pressure would be correspondingly increased, for example, to $\frac{1}{50}$ of a minute, with corresponding decrease in rate of production. However, care should be taken to avoid a temperature so high as to melt the foam.

In accordance with the present invention and in the attainment of the desired results, the design of the indenting implement or device is such that when the implement is applied, with the proper pressure and while heated to the proper temperature, to one face of the sheet while the opposite face of the sheet, rests upon or contacts a smooth supporting surface, each side of the completed sheet exhibits rows of indentations, with each indentation in one face of the material being directly opposite to and registering with an indentation in the other face. The indentations in each row are staggered with relation to those in adjacent rows, while the indentations are such and so arranged that the material, intervening between the indentations made by the indenting implement, takes the form of relatively movable foam masses. The depth and shapes of the indentations in the completed sheet and their arrangement is such that the continuity of both surfaces is broken and said masses are connected only by integral portions of the cellular material which are of such dimensions and so flexible that said masses are free to move relatively to one another in directions transverse of the thickness of the material— and thus the completed sheet is soft and limp, in these particulars contrasting markedly with the natural stiffness of the commercial foam sheet. Said masses and the connecting portions are of cellular structure; and the completed material is porous and pervious to air and moisture to substantially the same degree as the original sheet. Thus not only is the material herein disclosed and claimed useful as a heat-insulating lining ply for lamination with garment fabric, or the like, it has many other utilities by reason of its softness, and freedom from lint and chemical neutrality as, for example, as a wrapping for delicate articles; as a soft lining for containers of paper, cardboard or other material; as a single (unlaminated) ply useful as a polishing or wiping cloth for use in cleaning lenses or other glass articles, silverware or any finely finished or polished parts, and, because it is of such extreme softness and drapeability that it will bend in any direction under its own weight.

Other and further advantages of the invention will be pointed out in the following more detailed description and by reference to the accompanying drawings wherein.

It is common knowledge that certain synthetic foams, for specific example, commercial polyurethane sheet foam, has been treated, for example, for decorative purposes, as by the use of a suitable implement—maintained within a definite temperature range. For example, fully cured sheet foam has been treated to form parallel V-shaped grooves in one face, giving it a ribbed or corduroy effect. It is also known to provide polyurethane foam material with an ornamental pattern of projections by flowing a liquid, foam-forming material into spaced depressions arranged, according to a selected design, in a suitable rigid mold element. However, so far as is known, it has not heretofore been proposed to treat fully cured commercial polyurethane foam for the specific purpose of producing a foamed sheet material which is abnormally soft, limp and drapeable, as compared with the sheet foam of the same kind and thickness which is commercially obtainable.

Figure 1:
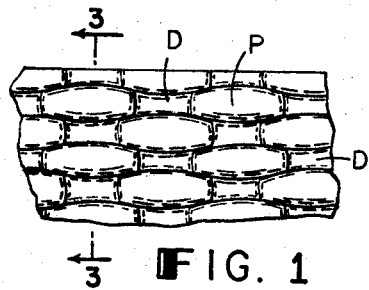
FIG. 1 is a plan view diagrammatically illustrating fabric according to the present invention, the illustration being approximately 4 times actual size.
Figure 2:
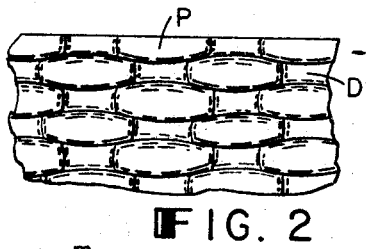
FIG. 2 is a view similar to FIG. 1, but showing the opposite face of the fabric.
Figures 3, 7:
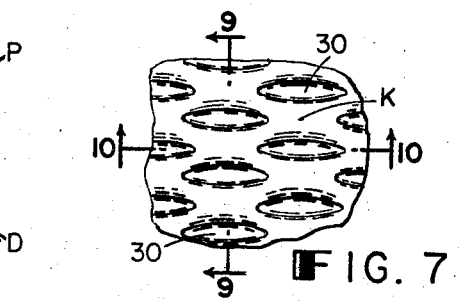
FIG. 3 is a section on the line 3—3 of FIG. 1.
FIG. 7 is a fragmentary plan view, showing one side of fabric, made by the use of the same indenting implement employed in making the fabric of FIG. 1, and having substantially the same physical characteristics, but starting with commercial polyurethane sheeting of slightly different density and thickness.
Figure 8:
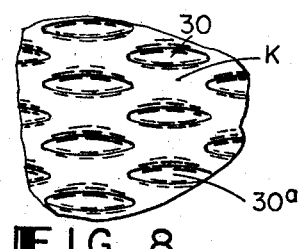
FIG. 8 is a view of the opposite side of the fabric shown in FIG. 7.

Referring to the drawings and particularly to FIG. 1, wherein one desirable fabric, made in accordance with the present invention and which is of a high degree of drapeability, is illustrated by way of example (this fabric preferably being of or at least having the heat-insulating value and porosity of polyurethane foam), is so indented as to define relatively movable, but integrally joined masses P of the foam material—the exposed surfaces of said masses being shown in FIGS. 1 and 2 as convex. These masses are arranged in spaced parallel rows wherein the masses of one row are staggered with relation to the masses of the next adjacent row—it being noted, by reference of FIG. 2, that the opposite faces of the fabric are substantially alike, in fact each unitary mass of material extends throughout the entire thickness of the fabric. In the specific example shown in FIG. 1, each individual mass is elongate transversely of the row in which it is situated, the masses of adjacent rows overlapping at their ends. As shown in FIG. 1, the masses are widest midway their lengths and gradually decrease in width toward their opposite ends. Moreover, as shown in FIG. 3, each mass of material is of maximum thickness at a point midway between its ends. These masses of material are defined by indentations D (FIGS. 1 and 2) appearing, respectively, at opposite faces of the sheet material—it being noted that each indentation on one side registers with and is directly opposite to an indentation on the opposite side. In a desirable embodiment of the invention by way of example, each of these movable masses of material, whose exposed surfaces constitute the masses P, is of a maximum length of the order of $3/16$ of an inch and of a maximum width of $1/8$ of an inch. Assuming that the initial thickness of the sheet material is 0.15 inch, then the maximum depth of each indentation, as formed by an indenting element, when initially formed, exceeds 0.075 inch, that is to say the indentation formed by an indenting element, while initially less in depth than the entire thickness of the original sheet, is of a depth exceeding one-half the thickness of the original sheet. This means that between the bottom of the indentation (when initially formed) and the opposite face of the foam sheet there is a web of foam less than one-half the thickness of the original sheet and which integrally joins the masses of foam immediately contiguous to the indentation. As a matter of practice, this uniting web is substantially less than one-half the thickness of the original sheet.

Since, by the use of a tool heated to a sufficiently high temperature, for example of the order of 550° F., it is possible to produce a permanent pattern of indentations in a selected foam ply in a period of the order of $1/100$ of a minute, but without melting the material or destroying its porosity. It is preferred to employ, as the indenting element, a rotating roll or cylinder R, as suggested in FIG. 6, whose surface is contoured to provide the desired design in the foam ply. As above noted, if foams of different character are employed, the indenting temperature or time will be selected accordingly, as determined by trial. Since somewhat toxic fumes are evolved during indenting, the operation should be carried out only with effective ventilation. The fumes emitted account for a loss, in weight, of approximately 0.5 of one percent.

In FIG. 2 the peripheral surface of such a cylinder or roll R is shown in developed diagrammatic form where said surface is shown as provided with circumferentially extending rows of projections or indenting elements 20a, 20b, with the projections 20a in one row staggered with relation to the projections 20b in the next adjacent row. These projections are connected at their ends by ribs 23 of lesser height than the projections 20a, 20b themselves.

As shown in FIGS. 3, 4, 11 and 12, the projections 20a, 20b are of approximately uniform thickness from top to bottom, and each has a blunt distal end (as contrasted with a knife edge), having smoothly rounded edges E, so that instead of cutting the polyurethane foam as they are pressed into it, these projections or indenting elements act with a compressing action so as to compact the foam at those areas which are in actual contact with the ends of the projections, with the result that the material is subjected to approximately the same degree of heat (less than that which would melt or solidify the foam) at all points while being compressed and is thereby induced to take a permanent set in the shape determined by the shape of the projections.

Figure 5:
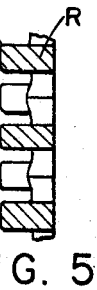
FIG. 5 is a fragmentary section longitudinally of the indenting roll substantially on the line 5—5 of FIG. 4.

In FIG. 5 there is diagrammatically indicated an indenting roll, such as above referred to, having indenting projections 20a, 20b, such as above described, on its peripheral surface and with which cooperates a smooth surfaced supporting roll 29, which may or may not be driven in time with the indenting roll 28, and which forms a support for the sheet plastic foam which is to be indented. The roll R will be turned at suitable speed by any appropriate mechanism (not shown) and may be kept heated to the desired temperature, for example, by internal electrically energized heating units H, or by exposure to some external heating means (not shown) of any appropriate type. As the roll R is rotated it feeds the plastic along, and by driving the roll at proper linear velocity the time during which the projections 20a, 20b of the indenting roll are embedded in the foam ply will be such as to insure permanency of the indentations formed in the foam ply. Since, as above pointed out, the indentations initially produced by indenting are of a depth exceeding one-half the thickness of the original sheet of foam (assumed, as a practical example, to be 0.150 inch) the maximum depth of the indentations as initially formed should substantially exceed 0.075 inch. Thus it follows that the material or web beneath the indenting projection, when the latter reaches its lowest point, is less than 0.075 inch in thickness, for example, it might be of the order of 0.03125 inch.

Figure 4:
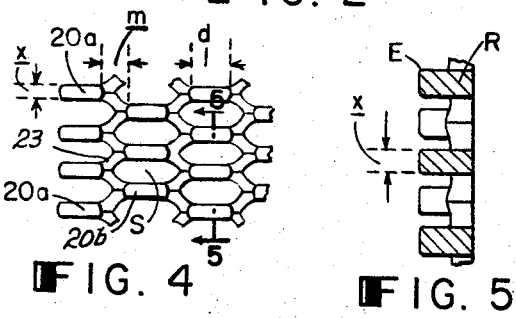
FIG. 4 is a fragmentary diagrammatic, developed view showing the pattern of the peripheral surface of an indenting roll such as may be employed in the manufacture of the fabric of FIG. 1.

As shown in FIGS. 3 and 4, the indentation forming projections 20a, 20b of the die are substantially isolated from one another. When, as shown in FIG. 5, the commercial, fully cured, polyurethane sheet is passed between the smooth-surfaced supporting roll 29 and the indenting roll R (the latter roll, at least, being kept (for example) at a predetermined temperature, between 550° F. and 575° F.); the applied pressure being (for example) within a range of from 40 to 80 p.s.i.; and the period of application of indenting pressure being (for example) of the order of $\frac{1}{100}$ of a minute, the unovbious result is that the surface contours of the opposite faces of the resultant completed sheet material are similar—that face of the material which contacted the smooth roll 29 having indentations, similar to, although not always so sharply defined, as the indentations directly produced by the indenting elements 20a and 20b, and with the thin webs W of the foam material, which initially were at the bottoms of the indentations, as shown at Wa (FIG. 11), now, in general, located between the planes of the upper and lower faces of the material as shown at W (FIG. 12)— said webs, as above noted, uniting contiguous masses P of material, each of which is much thicker than the webs. This result (that is to say, the similarity of the opposite faces of the sheet, and the location of the webs W) could hardly be foreseen. It may be attributed to the spongy, resilient character of the cured foam material and particularly to the fact that the pressure is applied by blunt, isolated, identing elements which do not incise the foam and which apply intense pressure only to isolated areas, and to those areas for a very short period of time in forming indentations which, initially, are of a depth more than one-half the thickness of the original sheet, but less than the initial thickness of the sheet. Under these conditions and within the specified temperature range and time of treatment, the natural elasticity of the foam (immediately contiguous to the identation, which has not been impaired substantially by the indenting) appears to draw the compressed material at the bottom of the indentation upwardly, until it lies, usually approximately midway, between the planes of the upper and lower surfaces of the sheet, thus producing the effect illustrated in FIG. 12, wherein the compressed material Wa (FIG. 11) is shown as having become the approximately midpositions web W which unites the masses P of material surrounding the indentation, and which, as thus positioned, provides the maximum of flexibility.

Merely by way of specific example of dimensions which save been found useful in the preparation of material having the desired characteristics, the indenting roll may be provided with indenting projections 20a, 20b, whose maximum length dimension d is of the order of 0.125 inch, and the distance m between lines, parallel to the axis of the roll, drawn through the continuous ends of projections 20a, 20b may be of the order of 0.0625 inch. Again, the maximum transverse width x of the projection 20a or 20b may be of the order of 0.0417 inch; the maximum spacing s between the proximate faces of projections in the same row may be of the order of 0.0837 inch and the maximum height of a projection 20a or 20b is 0.075 inch. It is contemplated that the indenting implement may be so dimensioned and the pressure applied such that, as the result of the indenting operation, the thickness of the completed foam sheet, between the parallel planes of its opposite faces, will not be diminished more than one-fourth of its initial thickness except at the location of the individual indentations. To insure drapeability of the high order required and other characteristics desirable when the material is to be used, for example, in garment manufacture, each foam mass must be of small dimensions. For example, each foam mass may be within a range of from $\frac{3}{32}$ to $\frac{3}{8}$ of an inch in length (preferably $\frac{3}{16}$ of an inch) and of a maximum width of from approximately two-thirds its maximum length. In material so characterized and produced as above described, the individual masses of foam are readily movable in directions at right angles to each other, that is to say, the fabric freely bends under its own weight transversely of its thickness.

Having thus prepared the indented foam material, it may be assembled with and permanently bonded to a ply of textile fabric in appropriate manner as, for example, with interposed adhesive. Lamellar material, so provided, is limp in all directions and shows no substantial tendency to form definite lines of fold. By the method just described, it is possible to produce lamellar fabric of this type at high speed and in desired widths according to the purpose for which it is intended and such fabric retains its initial characteristics, without substantial change, even though subjected to repeated launderings.

Figure 6:
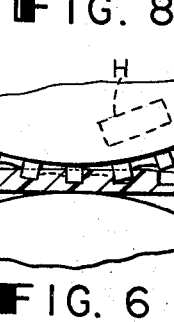
FIG. 6 is a fragmentary section, in a plane perpendicular to the axis of the indenting roll, showing the foam sheet as supported upon a smooth-surface roll while being indented.
Figure 9:
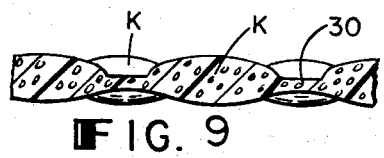
FIG. 9 is a fragmentary diagrammatic section on the line 9—9 of FIG. 7.
Figure 10:
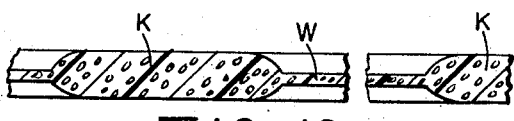
FIG. 10 is a similar view but on the line 10—10 of FIG. 7.
Figure 11:
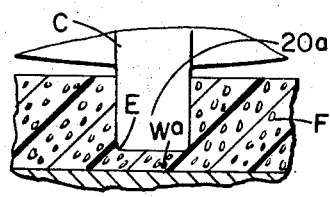
FIG. 11 is a fragmentary diagrammatic section illustrating the apparent action of a projection on the indenting implement as it applies pressure to the foam ply in accordance with the invention.
Figure 13:
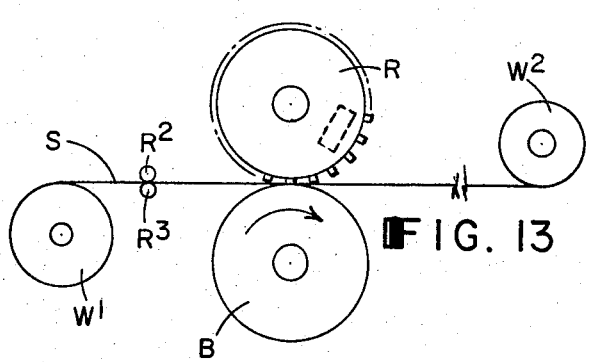
FIG. 13 is a fragmentary diagrammatic vertical section showing apparatus whereby, if desired, the sheeting may be subject to longitudinal tension during the indenting operation.
Figure 12:
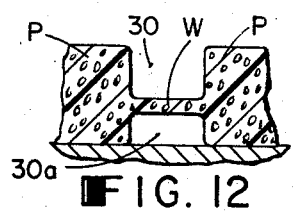
FIG. 12 is a section similar to FIG. 11, illustrative of the unique result of indenting fully cured urethane foam according to the practice of the present invention.

In FIGS. 6 to 9 there is also shown, by way of example, material in accordance with the present invention but of slightly different appearance as respects the shapes of the indentations formed in the sheet material and the shapes of the resultant movable masses which appear at the opposite sides of the fabric, although made by the use of the same indenting implement. Thus FIGS. 6 and 7 show opposite sides of the completed cellular material, made from an original sponge sheet fabric of a density and/or thickness different from that used in making the fabric of FIG. 1, but having been indented by the employment of the implement shown in FIG. 5. In the material of FIGS. 6 to 9, like that of FIG. 1, the indentations 30 (FIGS. 7 and 8) are in parallel rows with the indentations in one row staggered relatively to those in the adjacent rows, but these indentations, as illustrated, are of fusiform or spindle shape, tapering in opposite directions from a maximum width midway between their ends, and having arcuate ends of very small radius. The indentations are approximately $\frac{3}{16}$ of an inch long and of a maximum width of approximately $\frac{1}{16}$ of an inch when the original foam sheet is $\frac{3}{32}$ inches in thickness— the ends of the indentations in one row overlapping those in the next adjacent row a distance of approximately $\frac{1}{32}$ of an inch. Like the material of FIG. 1, the superficial area (per square unit of the completed cellular material) of the indentations relatively to the intervening foam masses is approximately of the order of 1:3.

As above pointed out, the result of the indenting of the commercial foam sheeting under the temperature and pressure conditions and for the period of time suggested, is to produce foam material whose opposite faces are generally similar in appearance, having indentations in one side which register width indentations in the opposite side, said indentations, when measured from either side of the completed fabric, being less in depth than the depth of the indentations when first made by the indenting device—but leaving very thin webs W of the foam material located between the planes of the opposite faces of the fabric, and which separate the indentations which extend inwardly from one face of the fabric from registering indentations which extend inwardly from the opposite face. The masses K of foam, having surfaces exposed at opposite sides of the fabric, are very freely movable, those portions of the fabric (of small cross-sectional area) which unite the contiguous foam masses K, bending readily in all directions, in this respect differing from a conventional hinge (which permits flexure about a single axis only). Thus, the resultant fabric is extremely limp and drapeable so that when combined (by lamination) with a woven textile fabric, it offers but very little resistance to the flexure of the woven fabric.

As suggested in a copending application, Ser. No. 536,827, filed Mar. 23, 1966, the normal elasticity of the material may be increased, if desired, by maintaining the material under tension while indenting it. Thus, as illustrated by way of example in FIG. 9, apparatus comprising the indenting roll R, the smooth bed roll or mandrel B and a pair of tensioning rolls R2, R3 may be employed for treating commercial foam sheeting S supplied in a roll W', from which the sheeting is drawn off between the tension rolls R2 and R3 and between the indenting roll R and the bed roll B to be wound up to form a roll W2—the rate of rotation of rolls R2 and R3 being so controlled as to tension the material between these rolls and the rolls R and B. The application of tension during the indenting operation increases the lengths of the relatively movable masses of material and to a certain extent reduces the thickness of the material as compared with that of the original sheet, at the same time increasing its elasticity so that if the material be crushed it automatically resumes its initial unwrinkled condition when the crushing force is released.

Commercial sheet polyurethane foam within the range of from $\frac{1}{16}$ to $\frac{3}{16}$ of an inch in thickness—and of a density within a range of from 1.50 to 3.00 pounds per cubic foot—may be used in accordance with the present invention in the production of material having the heat-insulating value and the limpness and drapeability required in insulating material for lamination with woven textile fabric in the manufacture of wearing apparel. Commercial sheet foam, within the ranges above suggested, when indented as herein described and by the use of an indenting implement such as herein specifically illustrated and dimensioned, may differ somewhat in appearance in accordance with the particular thickness and/or density of the original commercial sheeting, as shown, for instance, in the examples herein selected for illustration, but regardless of the thickness or density (within the above ranges) the resultant indented fabric has substantially the same physical characteristics, that is to say it comprises masses of foam arranged in rows wherein those in one row are staggered relatively to those in the adjacent rows, all of the masses being of substantially the same shape and substantially alike in maximum thickness and all united integrally by very flexible portions of the foam so that said masses are relatively movable and the material as a whole is very limp and drapeable, bending under its own weight with substantially the same freedom along lines parallel to and transversely of said rows.

However, as a result of the pressure applied and the temperature employed in treating the foam sheet, the indented material is thinner than the original foam sheet. For example, sheets initially up to $\frac{1}{8}$ (0.125) inch may be reduced 10 percent (that is, a sheet originally $\frac{1}{8}$ inch thick would be reduced to 0.1125 inch) while sheet foam $\frac{1}{8}$ to $\frac{3}{16}$ (0.1875) inch may be reduced as much as 25 percent (for example from 0.1873 to approximately 0.14 inch in thickness).

While commercial foam material beyond the upper limits of the ranges herein suggested may be treated in the manner herein described and may be found useful for decorative purposes or as cushioning material, the above ranges represent the limits within which material having the desired limpness and drapeability together with heat-insulating value, may be made in accordance with the present invention.

Certain dimensions have been suggested by way of example, but it is to be understood that changes in dimensions are contemplated as within the scope of the invention, although experience appears to indicate that for that high degree of drapeability required by the garment trade, the indentations are desirably of such dimensions and so spaced that from 30 to 40 of the indentations occur within one square inch of the material at each face of the fabric.

Moreover, although polyurethane foam, appears at the present time to be most appropriate in attaining the desired results, it is to be understood that the invention contemplates the substitution of such other foam material as may be found to be useful in attaining the objects above recited.

It may further be understood that because of the character of the material, the drawings, although generally illustrative of the invention, are not in all particulars, according to microscopic measurements.

I claim:
1. The method of preparing from fully cured commercial plastic foam sheeting a soft, homogeneous, single-ply, porous sheet material which is pervious to air and water and of cellular structure throughout and which is so limp as, for example, to be acceptable for use in garment manufacture as a heat-insulating ply for association with woven textile fabric, said method comprising as steps: providing a uniformly thick sheet of fully cured, resiliently spongy, homogeneous, commercial plastic foam of an approximate thickness of from $\frac{1}{16}$ to $\frac{3}{16}$ of an inch, and having physical properties approximating those of commercial polyurethane foam, characterized in supporting said sheet on a smooth, rigid bed member, providing elongate, rigid, blunt-ended indenting elements, heating said elements to a temperature within a range of from 325° F. to approximately 350° F., that is to say a temperature below that which would melt the foam, breaking the continuity of the upper surface of the foam sheet by so forcing the distal ends of the heated indenting elements downwardly into the foam, a distance exceeding one-half the thickness of the sheet but less than its full thickness as to form an all-over pattern of isolated depressions in the upper surface of the sheet wherein the depressions are arranged in rows with those in one row staggered relatively to those in the next row and thereby, by the mere formation of the depressions in the upper surface, producing a like, all-over pattern of depressions breaking the continuity of the lower surface of the sheet, each of the depressions in the lower surface registering with a depression in the upper surface and being separated from the registering depression solely by a thin web of the porous foam material of a thickness of the order of approximately 0.0325 inch, thereby so reducing the stiffness of the original sheet as to make the product sufficiently soft and limp to the acceptable as a heat-insulating ply for assembly with woven textile fabric in the manufacture of a garment.

2. As a new article of manufacture, the product of the method of claim 1.

References Cited
UNITED STATES PATENTS

| | | | |
|---|---|---|---|
| 2,865,046 | 12/1958 | Bird | 264—47 |
| 2,878,153 | 3/1959 | Hacklander | 264—248 |
| 2,964,441 | 12/1960 | Goldstone | 161—124 |
| 3,050,432 | 8/1962 | Weinbrenner et al. | 156—196 |
| 3,012,926 | 12/1961 | Wintermute et al. | 156—219 |

MORRIS SUSSMAN, *Primary Examiner.*